(12) United States Patent
Danziger et al.

(10) Patent No.: US 12,210,157 B2
(45) Date of Patent: Jan. 28, 2025

(54) AIR-GAP FREE PERPENDICULAR NEAR-EYE DISPLAY

(71) Applicant: Lumus Ltd., Ness Ziona (IL)

(72) Inventors: Yochay Danziger, Kfar Vradim (IL); Naamah Levin, Rehovot (IL)

(73) Assignee: LUMUS LTD., Ness Ziona (IL)

( * ) Notice: Subject to any disclaimer, the term of this patent is extended or adjusted under 35 U.S.C. 154(b) by 591 days.

(21) Appl. No.: 17/431,167

(22) PCT Filed: Apr. 5, 2020

(86) PCT No.: PCT/IB2020/053245
§ 371 (c)(1),
(2) Date: Aug. 15, 2021

(87) PCT Pub. No.: WO2020/202120
PCT Pub. Date: Oct. 8, 2020

(65) Prior Publication Data
US 2022/0128816 A1   Apr. 28, 2022

Related U.S. Application Data

(60) Provisional application No. 62/829,055, filed on Apr. 4, 2019.

(51) Int. Cl.
*G02B 27/14* (2006.01)
*G02B 5/04* (2006.01)
(Continued)

(52) U.S. Cl.
CPC ........... *G02B 27/0172* (2013.01); *G02B 5/04* (2013.01); *G02B 27/18* (2013.01)

(58) Field of Classification Search
CPC ....... G02B 27/0172; G02B 5/04; G02B 27/18
(Continued)

(56) References Cited

U.S. PATENT DOCUMENTS 2,748,659 A   6/1956   Geffcken et al.
2,958,258 A   11/1960  Kelly
(Continued)

FOREIGN PATENT DOCUMENTS

CN   1606712   4/2005
CN   1795399   6/2006
(Continued)

OTHER PUBLICATIONS

International Commission on Non-Ionizing Radiation Protection "ICNIRP Guidelines for Limiting Exposure to Time-Varying Electric, Magnetic and Electromagnetic Fields (Up to 300 Ghz)" Published In: Health Physics 74 (4):494-522; 1998.
(Continued)

*Primary Examiner* — Audrey Y Chang
(74) *Attorney, Agent, or Firm* — Rivka Friedman

(57) ABSTRACT

A near-eye display comprised of a projector having an exit aperture through which is transmitted a plurality of rays including a first and second extreme ray defining opposite ends of an image angular field of view and the physical exit aperture, and a chief ray defining a midpoint of the image angular field view. The near-eye display further includes a light-guide optical element (LOE) having first and second parallel surfaces along a length thereof, and a reflector angled obliquely relative to the pair of parallel surfaces. The near eye display is arranged such that each of the plurality of rays follows a light path comprised of entering the LOE through the first parallel surface at a predetermined entry point, reflecting off the LOE's first parallel surface at a predetermined reflection point, and subsequently undergoing total internal reflection within the LOE, wherein the reflection point of the first extreme ray is located beyond the entry point of the second extreme ray.

4 Claims, 7 Drawing Sheets

(51) Int. Cl.
  *G02B 27/01* (2006.01)
  *G02B 27/18* (2006.01)
(58) Field of Classification Search
  USPC .................................. 359/630, 569; 385/36
  See application file for complete search history.

(56) References Cited

U.S. PATENT DOCUMENTS

| | | | |
|---|---|---|---|
| 3,626,394 A | 12/1971 | Nelson et al. | |
| 3,667,621 A | 6/1972 | Barlow | |
| 3,737,212 A | 6/1973 | Antonson et al. | |
| 3,807,849 A | 4/1974 | Lobb | |
| 3,873,209 A | 3/1975 | Schinke et al. | |
| 3,940,204 A | 2/1976 | Withrington | |
| 4,084,883 A | 4/1978 | Eastman et al. | |
| 4,233,526 A | 11/1980 | Kurogi et al. | |
| 4,240,738 A | 12/1980 | Praamsma | |
| 4,309,070 A | 1/1982 | St. Leger Searle | |
| 4,331,387 A | 5/1982 | Wentz | |
| 4,383,740 A | 5/1983 | Bordovsky | |
| 4,516,828 A | 5/1985 | Steele | |
| 4,613,216 A | 9/1986 | Herbec et al. | |
| 4,653,844 A * | 3/1987 | Ward | G02B 5/04 385/36 |
| 4,711,512 A | 12/1987 | Upatnieks | |
| 4,755,667 A | 7/1988 | Marsoner et al. | |
| 4,775,217 A | 10/1988 | Ellis | |
| 4,798,448 A | 1/1989 | van Raalte | |
| 4,799,765 A | 1/1989 | Ferrer | |
| 4,805,988 A | 2/1989 | Dones | |
| 4,932,743 A * | 6/1990 | Isobe | G02B 6/34 385/36 |
| 5,033,828 A | 7/1991 | Haruta | |
| 5,076,664 A | 12/1991 | Migozzi | |
| 5,096,520 A | 3/1992 | Faris | |
| 5,208,800 A | 5/1993 | Isobe et al. | |
| 5,231,642 A | 7/1993 | Scifres et al. | |
| 5,235,589 A | 8/1993 | Yokomori et al. | |
| 5,301,067 A | 4/1994 | Bleier et al. | |
| 5,353,134 A | 10/1994 | Michel et al. | |
| 5,369,415 A | 11/1994 | Richard et al. | |
| 5,453,877 A | 9/1995 | Gerbe et al. | |
| 5,481,385 A | 1/1996 | Zimmerman et al. | |
| 5,537,260 A | 7/1996 | Williamson | |
| 5,539,578 A | 7/1996 | Togino et al. | |
| 5,543,877 A | 8/1996 | Takashi et al. | |
| 5,555,329 A | 9/1996 | Kuper et al. | |
| 5,594,830 A | 1/1997 | Winston et al. | |
| 5,619,601 A | 4/1997 | Akashi et al. | |
| 5,650,873 A | 7/1997 | Gal et al. | |
| 5,680,209 A | 10/1997 | Machler | |
| 5,708,449 A | 1/1998 | Heacock et al. | |
| 5,712,694 A | 1/1998 | Taira et al. | |
| 5,724,163 A | 3/1998 | David | |
| 5,751,480 A | 5/1998 | Kitagishi | |
| 5,808,709 A | 9/1998 | Davis | |
| 5,808,800 A | 9/1998 | Handschy | |
| 5,896,232 A | 4/1999 | Budd et al. | |
| 5,966,223 A | 10/1999 | Yaakov et al. | |
| 5,982,536 A | 11/1999 | Swan | |
| 6,007,225 A | 12/1999 | Ramer et al. | |
| 6,052,500 A | 4/2000 | Takano et al. | |
| 6,091,548 A | 7/2000 | Chen | |
| 6,144,347 A | 11/2000 | Mizoguchi et al. | |
| 6,185,015 B1 | 2/2001 | Reinhorn et al. | |
| 6,222,676 B1 | 4/2001 | Togino et al. | |
| 6,222,677 B1 | 4/2001 | Budd et al. | |
| 6,222,971 B1 | 4/2001 | Veligdan et al. | |
| 6,239,092 B1 | 5/2001 | Papasso et al. | |
| 6,266,108 B1 | 7/2001 | Bao | |
| 6,307,612 B1 | 10/2001 | Smith | |
| 6,324,330 B1 | 11/2001 | Stites | |
| 6,349,001 B1 | 2/2002 | Spitzer | |
| 6,362,861 B1 | 3/2002 | Hertz et al. | |
| 6,384,982 B1 | 5/2002 | Spitzer | |
| 6,388,814 B2 | 5/2002 | Tanaka | |
| 6,400,493 B1 | 6/2002 | Mertz et al. | |
| 6,404,550 B1 | 6/2002 | Yajima | |
| 6,404,947 B1 | 6/2002 | Matsuda | |
| 6,406,149 B2 | 6/2002 | Okuyama | |
| 6,421,031 B1 | 7/2002 | Ronzani et al. | |
| 6,480,174 B1 | 11/2002 | Kaufmass et al. | |
| 6,490,087 B1 | 12/2002 | Fulkerson et al. | |
| 6,490,104 B1 | 12/2002 | Gleckman et al. | |
| 6,509,982 B2 | 1/2003 | Steiner | |
| 6,542,307 B2 | 4/2003 | Gleckman | |
| 6,580,529 B1 | 6/2003 | Amitai et al. | |
| 6,671,100 B1 | 12/2003 | McRuer | |
| 6,690,513 B2 | 2/2004 | Hulse et al. | |
| 6,704,065 B1 | 3/2004 | Sharp et al. | |
| 6,799,859 B1 | 10/2004 | Ida et al. | |
| 6,879,443 B2 | 4/2005 | Spitzer et al. | |
| 6,894,821 B2 | 5/2005 | Kotchick | |
| 7,163,291 B2 | 1/2007 | Cado et al. | |
| 7,285,903 B2 | 10/2007 | Cull et al. | |
| 7,430,355 B2 | 9/2008 | Heikenfeld et al. | |
| 7,448,170 B2 | 11/2008 | Milovan et al. | |
| 7,554,737 B2 | 6/2009 | Knox et al. | |
| 7,577,326 B2 | 8/2009 | Amitai | |
| 7,643,214 B2 | 1/2010 | Amitai | |
| 7,667,962 B2 | 2/2010 | Mullen | |
| 7,672,055 B2 | 3/2010 | Amitai | |
| 7,710,655 B2 | 5/2010 | Freeman et al. | |
| 7,724,442 B2 | 5/2010 | Amitai | |
| 7,724,443 B2 | 5/2010 | Amitai | |
| 7,751,122 B2 | 7/2010 | Amitai | |
| 7,777,960 B2 | 8/2010 | Freeman | |
| 7,995,275 B2 | 8/2011 | Maeda et al. | |
| 8,035,872 B2 | 10/2011 | Ouchi | |
| 8,187,481 B1 | 5/2012 | Hobbs | |
| 8,405,573 B2 | 3/2013 | Lapidot et al. | |
| 8,467,133 B2 | 6/2013 | Miller | |
| 8,611,015 B2 | 12/2013 | Wheeler et al. | |
| 8,655,178 B2 | 2/2014 | Capron et al. | |
| 8,665,178 B1 | 3/2014 | Wang | |
| 8,783,893 B1 | 7/2014 | Seurin et al. | |
| 8,786,519 B2 | 7/2014 | Blumenfeld et al. | |
| 8,810,914 B2 | 8/2014 | Amitai et al. | |
| 8,854,734 B2 | 10/2014 | Ingram | |
| 8,861,081 B2 | 10/2014 | Amitai et al. | |
| 8,902,503 B2 | 12/2014 | Amitai et al. | |
| 8,913,865 B1 | 12/2014 | Bennett | |
| 8,988,776 B2 | 3/2015 | Weber et al. | |
| 8,998,414 B2 | 4/2015 | Bohn | |
| 9,069,180 B2 | 6/2015 | Amitai et al. | |
| 9,104,036 B2 | 8/2015 | Amitai et al. | |
| 9,248,616 B2 | 2/2016 | Amitai | |
| 9,279,986 B2 | 3/2016 | Amitai | |
| 9,500,869 B2 | 11/2016 | Amitai et al. | |
| 9,551,874 B2 | 1/2017 | Amitai | |
| 9,551,880 B2 | 1/2017 | Amitai | |
| 9,568,738 B2 * | 2/2017 | Mansharof | G02B 27/14 |
| 9,664,910 B2 | 5/2017 | Mansharof et al. | |
| 9,804,396 B2 | 10/2017 | Amitai | |
| 9,805,633 B2 | 10/2017 | Zheng | |
| 9,910,283 B2 | 3/2018 | Amitai | |
| 9,977,244 B2 | 5/2018 | Amitai | |
| 10,048,499 B2 | 8/2018 | Amitai | |
| 10,088,633 B2 | 10/2018 | Mason | |
| 10,222,535 B2 | 3/2019 | Remhof et al. | |
| 10,302,835 B2 | 5/2019 | Danziger | |
| 2001/0030860 A1 | 10/2001 | Kimura et al. | |
| 2002/0008708 A1 | 1/2002 | Weiss et al. | |
| 2002/0015233 A1 | 2/2002 | Park | |
| 2002/0021498 A1 | 2/2002 | Ohtaka | |
| 2002/0080615 A1 | 6/2002 | Marshall et al. | |
| 2002/0080622 A1 | 6/2002 | Pashley et al. | |
| 2002/0097962 A1 | 7/2002 | Yoshimura et al. | |
| 2002/0176173 A1 | 11/2002 | Song | |
| 2002/0186179 A1 | 12/2002 | Knowles | |
| 2002/0191297 A1 | 12/2002 | Gleckman et al. | |
| 2003/0020006 A1 | 1/2003 | Janeczko et al. | |
| 2003/0063042 A1 | 4/2003 | Friesem et al. | |
| 2003/0197938 A1 | 10/2003 | Schmidt et al. | |

(56) References Cited

U.S. PATENT DOCUMENTS

| | | |
|---|---|---|
| 2003/0218718 A1 | 11/2003 | Moliton et al. |
| 2004/0080718 A1 | 4/2004 | Kojima |
| 2004/0130797 A1 | 7/2004 | Leigh Travis |
| 2004/0137189 A1 | 7/2004 | Tellini et al. |
| 2004/0145814 A1 | 7/2004 | Rogers |
| 2004/0263842 A1 | 12/2004 | Puppels et al. |
| 2004/0264185 A1 | 12/2004 | Grotsch et al. |
| 2005/0018308 A1 | 1/2005 | Cassarly et al. |
| 2005/0023545 A1 | 2/2005 | Camras et al. |
| 2005/0024849 A1 | 2/2005 | Parker et al. |
| 2005/0084210 A1 | 4/2005 | Cha |
| 2005/0173719 A1 | 8/2005 | Yonekubo et al. |
| 2005/0174658 A1 | 8/2005 | Long et al. |
| 2005/0180687 A1 | 8/2005 | Amitai |
| 2005/0248852 A1 | 11/2005 | Yamasaki |
| 2006/0052146 A1 | 3/2006 | Ou |
| 2006/0061555 A1 | 3/2006 | Mullen |
| 2006/0091784 A1 | 5/2006 | Conner et al. |
| 2006/0103590 A1 | 5/2006 | Divon |
| 2006/0228073 A1 | 10/2006 | Mukawa |
| 2006/0268421 A1 | 11/2006 | Shimizu et al. |
| 2007/0003570 A1 | 2/2007 | Margulis |
| 2007/0035706 A1 | 2/2007 | Margulis |
| 2007/0070504 A1 | 3/2007 | Akutsu |
| 2007/0070859 A1 | 3/2007 | Hirayama |
| 2007/0153344 A1 | 7/2007 | Lin |
| 2007/0165192 A1 | 7/2007 | Prior |
| 2007/0284565 A1 | 12/2007 | Leatherdale et al. |
| 2007/0285663 A1 | 12/2007 | Hewitt et al. |
| 2007/0291491 A1 | 12/2007 | Li et al. |
| 2008/0030974 A1 | 2/2008 | Abu-Ageel |
| 2008/0062686 A1 | 3/2008 | Hoelen et al. |
| 2008/0068852 A1 | 3/2008 | Goihl |
| 2008/0151375 A1 | 6/2008 | Lin |
| 2008/0198604 A1 | 8/2008 | Kim et al. |
| 2008/0259429 A1 | 10/2008 | Kamm |
| 2009/0059380 A1 | 3/2009 | Moliton |
| 2009/0165017 A1 | 6/2009 | Syed et al. |
| 2009/0275157 A1 | 11/2009 | Winberg et al. |
| 2010/0002465 A1 | 1/2010 | Tsang et al. |
| 2010/0020291 A1 | 1/2010 | Kasazumi et al. |
| 2010/0027289 A1 | 2/2010 | Aiki et al. |
| 2010/0046234 A1 | 2/2010 | Abu-Ageel |
| 2010/0201953 A1 | 8/2010 | Freeman |
| 2010/0202128 A1 | 8/2010 | Saccomanno |
| 2010/0202129 A1 | 8/2010 | Abu-Ageel |
| 2010/0214635 A1 | 8/2010 | Sasaki et al. |
| 2010/0278480 A1 | 11/2010 | Vasylyev et al. |
| 2010/0291489 A1 | 11/2010 | Moskovits et al. |
| 2010/0302276 A1 | 12/2010 | Levola |
| 2011/0007243 A1 | 1/2011 | Tanaka |
| 2011/0096566 A1 | 4/2011 | Tsai et al. |
| 2011/0228511 A1 | 9/2011 | Weber |
| 2012/0069547 A1 | 3/2012 | Gielen et al. |
| 2012/0194781 A1 | 8/2012 | Agurok |
| 2012/0281389 A1 | 11/2012 | Panagotacos et al. |
| 2012/0287621 A1 | 11/2012 | Lee et al. |
| 2013/0022316 A1 | 1/2013 | Pelletier et al. |
| 2013/0038933 A1 | 2/2013 | Wang |
| 2013/0120986 A1 | 5/2013 | Xi |
| 2013/0135749 A1 | 5/2013 | Akutsu et al. |
| 2013/0201690 A1 | 8/2013 | Vissenberg et al. |
| 2013/0208498 A1 | 8/2013 | Ouderkirk |
| 2013/0215361 A1 | 8/2013 | Wang |
| 2013/0257832 A1 | 10/2013 | Hammond |
| 2013/0334504 A1 | 12/2013 | Thompson et al. |
| 2014/0003762 A1 | 1/2014 | Macnamara |
| 2014/0104852 A1 | 4/2014 | Duong et al. |
| 2014/0140654 A1 | 5/2014 | Brown et al. |
| 2014/0192539 A1 | 7/2014 | Yriberri et al. |
| 2014/0226215 A1 | 8/2014 | Komatsu |
| 2014/0226361 A1 | 8/2014 | Vasylyev |
| 2014/0264420 A1 | 9/2014 | Edwards et al. |
| 2014/0293434 A1 | 10/2014 | Cheng |
| 2014/0334126 A1 | 11/2014 | Speier et al. |
| 2014/0374377 A1 | 12/2014 | Schulz |
| 2015/0009682 A1 | 1/2015 | Clough |
| 2015/0009687 A1 | 1/2015 | Lin |
| 2015/0016777 A1 | 1/2015 | Abovitz et al. |
| 2015/0049486 A1 | 2/2015 | Jung et al. |
| 2015/0081313 A1 | 3/2015 | Boross et al. |
| 2015/0098206 A1 | 4/2015 | Pickard et al. |
| 2015/0103306 A1 | 4/2015 | Kaji et al. |
| 2015/0138451 A1 | 5/2015 | Amitai |
| 2015/0153569 A1 | 6/2015 | Yonekubo |
| 2015/0182348 A1 | 7/2015 | Siegal et al. |
| 2015/0185475 A1 | 7/2015 | Saarikko et al. |
| 2015/0219834 A1 | 8/2015 | Nichol et al. |
| 2015/0247617 A1 | 9/2015 | Du et al. |
| 2015/0260992 A1 | 9/2015 | Luttmann et al. |
| 2015/0355481 A1 | 12/2015 | Hilkes et al. |
| 2016/0041387 A1 | 2/2016 | Valera et al. |
| 2016/0109712 A1 | 4/2016 | Harrison et al. |
| 2016/0116743 A1 | 4/2016 | Amitai |
| 2016/0161740 A1 | 6/2016 | Bar-Zeev et al. |
| 2016/0189432 A1 | 6/2016 | Bar-Zeev et al. |
| 2016/0209648 A1 | 7/2016 | Haddick et al. |
| 2016/0209657 A1 | 7/2016 | Popovich et al. |
| 2016/0215956 A1 | 7/2016 | Smith et al. |
| 2016/0234485 A1 | 8/2016 | Robbins et al. |
| 2016/0266387 A1 | 9/2016 | TeKolste |
| 2016/0313567 A1 | 10/2016 | Kurashige |
| 2016/0327906 A1 | 11/2016 | Futterer |
| 2016/0341964 A1 | 11/2016 | Amitai |
| 2016/0370534 A1 | 12/2016 | Liu et al. |
| 2017/0003504 A1 | 1/2017 | Vallius |
| 2017/0011555 A1 | 1/2017 | Li et al. |
| 2017/0017095 A1 | 1/2017 | Fricker et al. |
| 2017/0045666 A1 | 2/2017 | Vasylyev |
| 2017/0122725 A1 | 5/2017 | Yeoh |
| 2017/0176755 A1 | 6/2017 | Cai |
| 2017/0276947 A1 | 9/2017 | Yokoyama |
| 2017/0336636 A1 | 11/2017 | Amitai et al. |
| 2017/0343822 A1 | 11/2017 | Border et al. |
| 2017/0353714 A1 | 12/2017 | Poulad et al. |
| 2017/0357095 A1 | 12/2017 | Amitai |
| 2017/0363799 A1 | 12/2017 | Ofir |
| 2018/0039082 A1 | 2/2018 | Amitai |
| 2018/0067315 A1 | 3/2018 | Amitai et al. |
| 2018/0120559 A1 | 5/2018 | Yeoh et al. |
| 2018/0157057 A1 | 6/2018 | Gelberg et al. |
| 2018/0267295 A1 | 9/2018 | Dalrymple et al. |
| 2018/0292599 A1 | 10/2018 | Ofir et al. |
| 2019/0011710 A1 | 1/2019 | Amitai |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0377122 A1 | 12/2019 | Danziger |
| 2020/0057308 A1* | 2/2020 | Choi .................. G02B 27/0101 |
| 2020/0117005 A1* | 4/2020 | Chi ..................... G02B 27/0172 |
| 2020/0120329 A1 | 4/2020 | Danziger |

FOREIGN PATENT DOCUMENTS

| | | |
|---|---|---|
| CN | 101542346 | 9/2009 |
| CN | 101846799 | 9/2010 |
| CN | 101846799 A | 9/2010 |
| DE | 1422172 | 11/1970 |
| DE | 19725262 | 12/1998 |
| DE | 102013106392 | 12/2014 |
| EP | 0365406 | 4/1990 |
| EP | 0380035 | 8/1990 |
| EP | 0543718 | 5/1993 |
| EP | 0566004 | 10/1993 |
| EP | 0580952 | 2/1994 |
| EP | 1158336 | 11/2001 |
| EP | 1180711 | 2/2002 |
| EP | 1326102 | 7/2003 |
| EP | 0399865 | 1/2004 |
| EP | 1385023 | 1/2004 |

(56) References Cited

FOREIGN PATENT DOCUMENTS

| | | |
|---|---|---|
| EP | 1485747 | 12/2004 |
| EP | 1562066 | 8/2005 |
| EP | 1691547 | 8/2006 |
| EP | 0770818 | 4/2007 |
| EP | 1779159 | 5/2007 |
| FR | 2496905 | 6/1982 |
| FR | 2638242 | 4/1990 |
| FR | 2721872 | 1/1996 |
| GB | 2220081 | 12/1989 |
| GB | 2272980 | 6/1994 |
| GB | 2278222 | 11/1994 |
| GB | 2278888 | 12/1994 |
| IL | 183637 | 6/2013 |
| JP | 2002350771 | 12/2002 |
| JP | 2002368762 | 12/2002 |
| JP | 2003140081 | 5/2003 |
| JP | 2003520984 | 7/2003 |
| JP | 2004233909 | 8/2004 |
| JP | 2012-058404 | 3/2012 |
| KR | 101470387 | 12/2014 |
| TW | 201809798 | 3/2018 |
| WO | 9314393 | 7/1993 |
| WO | 9510106 | 4/1995 |
| WO | 9815868 | 4/1998 |
| WO | 9952002 | 10/1999 |
| WO | 0004407 | 1/2000 |
| WO | 0063738 | 10/2000 |
| WO | 0195025 | 12/2001 |
| WO | 0195027 | 12/2001 |
| WO | 2082168 | 10/2002 |
| WO | 03058320 | 7/2003 |
| WO | 03081320 | 10/2003 |
| WO | 2004109349 | 12/2004 |
| WO | 2008023367 | 2/2008 |
| WO | 2009066408 | 5/2009 |
| WO | 2011130720 | 10/2011 |
| WO | 2012008966 | 1/2012 |
| WO | 2013065656 | 5/2013 |
| WO | 2013112705 | 8/2013 |
| WO | 2013188464 | 12/2013 |
| WO | 2014076599 | 5/2014 |
| WO | 2014155096 | 10/2014 |
| WO | 2015081313 | 6/2015 |
| WO | 2016/017085 | 2/2016 |
| WO | 2016103251 | 6/2016 |
| WO | 2016/181459 | 11/2016 |
| WO | 2017106873 | 6/2017 |
| WO | 2018138714 | 8/2018 |

OTHER PUBLICATIONS

Jan van de Kraats et al. "Directional and nondirectional spectral reflection from the human fovea" journal of biomedical optics 13(2), 024010 Mar./ Apr. 2008.

Petros L. Stavroulakis et al: "Suppression iof backsacattered diffraction from sub-wavelength 'moth-eye arrays '"; published in Optics Express Jan. 2013.

Jan Van De Kraats; et al. "Directional and Non-Directional Spectral reflection from the Human Fovea"; Journal of Biomedial Optics vol. (13)/2.

International Commission on Non-Ionizing Iradiation Protection : "NCIRP Guidelines for limiting Exposure to Time-Varying Electric, Magnetic and Electromagnetic Fields "; Published in Health Physics , Apr. 1998 vol. 74 No. 4.

R.J Wiblein et al ; "Optimized Anti-Reflective structures for $As_2s_3$ Chalcogenide Optical Fibers", published in Optics Express , May 2, 2016 vol. 24 No. 9.

O.Yang et al; "Antireflection Effects at NanoStructures Materials Interfaces and teh Suppression of Thin-Film Intereference";published in Nanotechnology 24 (2013).

* cited by examiner

AIR-GAP FREE PERPENDICULAR NEAR-EYE DISPLAY

TECHNICAL FIELD

The presently disclosed subject matter relates to near-eye displays and, more particularly, to air-gap free perpendicular near-eye displays.

BACKGROUND

In some near-eye display systems, a compact image projector injects light corresponding to a collimated image into a light-guide optical element ("LOE"). The image propagates within the LOE by total internal reflection (TIR) and is eventually coupled-out to an observer's eye either by a series of mutually parallel oblique partially-reflective surfaces or by diffractive elements.

In some cases it is desirable for the length of the LOE along which the image propagates to be oriented perpendicular to the exit optical axis of the projector. This orientation presents certain challenges whereby the full image field of view exiting the projector must be reflected towards an input aperture of the LOE. In order to guarantee TIR of each of the rays within the LOE after reflection, the LOE is typically separated from the projector by an air-gap. However, in some applications of perpendicular near-eye displays it may be desirable or even necessary for the near-eye display to be constructed using an air-gap free architecture.

GENERAL DESCRIPTION

According to one aspect of the presently disclosed subject matter there is provided a near-eye display including: a projector having an exit aperture through which is transmitted a plurality of rays including a first and second extreme ray defining opposite ends of an image angular field of view and the physical exit aperture, and a chief ray defining a midpoint of the image angular field view; a light-guide optical element (LOE) having first and second parallel surfaces along a length thereof and oriented substantially perpendicular to an optical axis of the chief ray; and a reflector angled obliquely relative to the pair of parallel surfaces so as to couple-in light from the projector into the LOE, the reflector provided at least in part at a surface of a prism adjacent to the LOE; wherein the near eye display is arranged such that each of the plurality of rays follows a light path comprised of, in order: entering the LOE through the first parallel surface at a predetermined entry point associated with the respective ray, reflecting off the LOE's first parallel surface at a predetermined reflection point associated with the respective ray, and subsequently undergoing total internal reflection within the LOE, and wherein along the length of the LOE, the reflection point associated with the first extreme ray is located beyond the entry point associated with the second extreme ray.

According to some aspects, the exit aperture of the projector ends along the length of the first parallel surface at a point that is after the entry point associated with the second extreme ray but before the reflection point of the first extreme ray.

According to some aspects, a portion of the first parallel surface is coated with a reflective layer, the portion including the reflection point of the first extreme ray and not including the entry point of the second extreme ray.

According to some aspects, the reflective layer includes one of a metallic coating or a dielectric coating.

According to some aspects, the near-eye display further includes a wedge prism interposed between at least a portion of the projector and the first parallel surface.

According to another aspect of the presently disclosed subject matter there is provided a near-eye display including: a projector having an exit aperture through which is transmitted a plurality of rays including a first and second extreme ray defining opposite ends of an image angular field of view and the physical exit aperture, and a chief ray defining a midpoint of the image angular field view; a light-guide optical element (LOE) having first and second parallel surfaces along a length thereof and oriented substantially perpendicular to an optical axis of the chief ray, the LOE having a first refractive index (RI); an intermediate layer between the projector and the first parallel surface along a first portion of the first parallel surface, the intermediate layer having a second RI lower than the first RI; and a coupling-in element configured to re-direct the light from the projector into the LOE through the second parallel surface; wherein the near eye display is arranged such that each of the plurality of rays follows a light path comprised of, in order: entering the LOE through the first parallel surface at a predetermined entry point associated with the respective ray, reflecting off the LOE's first parallel surface at a predetermined reflection point associated with the respective ray, and subsequently undergoing total internal reflection within the LOE, and wherein along the length of the LOE, the reflection point associated with the first extreme ray is located prior to the entry point associated with the second extreme ray.

According to some aspects, the coupling-in element includes a reflector angled obliquely relative to the pair of parallel surfaces.

According to some aspects, the reflector is provided at least in part at a surface of a prism adjacent to the LOE.

According to some aspects, the coupling-in element includes a diffractive grating.

According to some aspects, the intermediate layer includes one of an adhesive layer or a transparent plate.

According to some aspects, the near-eye display further includes a reflective layer between the projector and the first parallel surface along a second portion of the first parallel surface that is beyond the entry point associated with the second extreme ray.

According to some aspects, the reflective layer includes one of a metallic coating or a dielectric coating.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, and components have not been described in detail so as not to obscure the presently disclosed subject matter.

Figure 1:
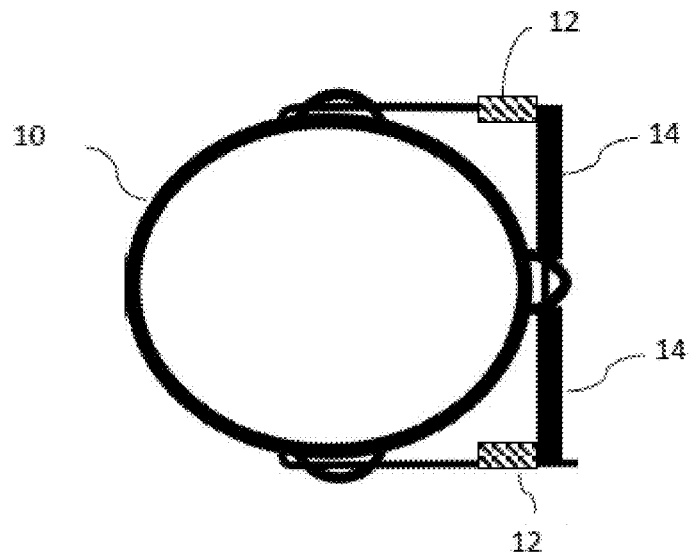
FIG. 1 illustrates schematically a top view of a perpendicular near-eye display system.

FIG. 1 illustrates schematically a top view of a near-eye display system worn on the head 10 of an observer. The near-eye display system comprises a projector 12 and associated LOE 14 for each eye. Ergonomically, it is often preferable for projector 12 to be perpendicular (or close to perpendicular) to its associated LOE 14 as shown in FIG. 1. By "perpendicular" it is meant that the image propagates within the LOE along an axis that is roughly perpendicular to the beam of light exiting the LOE.

Figure 2:
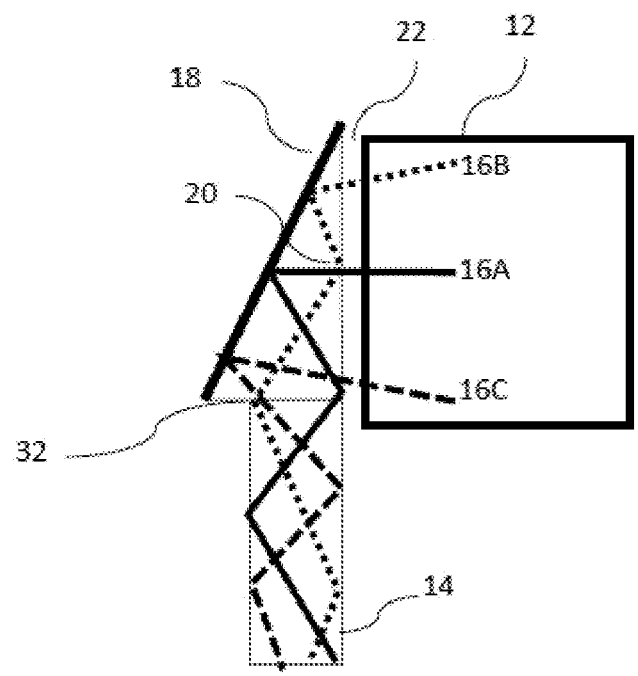
FIG. 2 illustrates schematically a cross-sectional view of a perpendicular near-eye display according to the prior art.

FIG. 2 illustrates schematically a cross-sectional view of an existing perpendicular near-eye display. Projector optics 12 (hereinafter referred to simply as "projector"), corresponding to an image coupling-out optical element comprised within a projector (e.g. collimating optics, polarizing beam splitter, etc.) transmits chief ray 16A and two rays 16B, 16C corresponding to the extreme rays that define the outer bounds of the image angular field of view (FOV) and are likewise physically transmitted at the opposite ends of the exit aperture of projector 12, so that no light exits the projector beyond rays 16B, 16C. It should be understood by persons skilled in the art that projector 12 transmits many other rays between 16B and 16C that are omitted in FIG. 2 for clarity. In the case of two-axis aperture expansion, the element shown here as the "projector" may in fact be another LOE, (i.e. extending into the page of FIG. 2), where the illustrated rays are coupled-out from the first LOE by partially-reflective facets, or by diffractive elements, along the length of the first LOE into a corresponding wide dimension of LOE 14 (i.e. into the page).

Each of rays 16A, 16B, and 16C reflect from a reflector 18 towards LOE 14. Reflector 18 can be supported by a prism 19. The reflector 18 is oriented at a predetermined position and angle to reflect each of the rays toward an input aperture 32 of LOE 14 such that the rays become trapped within the LOE and propagate along the LOE by Total Internal Reflection (TIR) between the major parallel surfaces of the LOE. Since ray 16B hits the reflector 18 at a point relatively high on the reflector, ray 16B is immediately reflected back towards the projector. Therefore, in order to redirect ray 16B at point 20 toward the input aperture of the LOE (rather than entering projector 12), the projector is separated from prism 19 by an air-gap 22. The difference in refractive index (RI) between prism 19 and air-gap 22 causes ray 16B to reflect off the surface of prism 19 toward the input aperture of LOE 14. Although the function of the air-gap is described only with reference to ray 16B, the air-gap is similarly required for other rays as well.

However, in some cases it may be desirable for a perpendicular near-eye display to be constructed using an air-gap free architecture. Some of the benefits of an air-gap free near-eye display include greater manufacturing precision, and a reduced vulnerability to variations in environmental conditions.

Figure 3A:
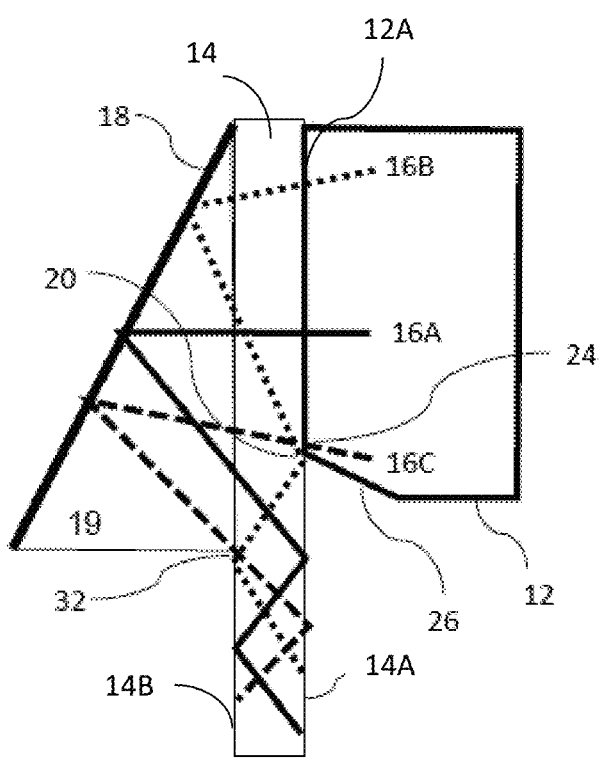
FIG. 3A illustrates schematically a cross-sectional view of a perpendicular near-eye display according to a first embodiment of the disclosed subject matter.
Figure 3B:
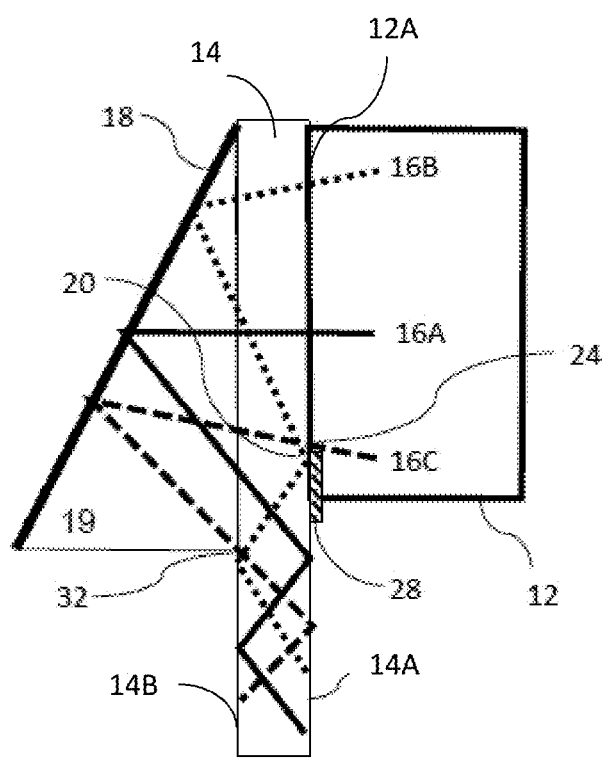
FIG. 3B illustrates schematically a cross-sectional view of a perpendicular near-eye display according to a second embodiment of the disclosed subject matter.

FIGS. 3A-3B illustrate schematically a cross-sectional view of an air-gap free perpendicular near-eye display according to embodiments of the presently disclosed subject matter. The near-eye display includes a projector 12 having an exit aperture 12A through which is transmitted a plurality of rays including extreme rays 16B, 16C defining opposite ends of an image angular field of view and the physical exit aperture, and a chief ray 16A defining a midpoint of the image angular field view.

The near-eye display further includes a LOE with two parallel surfaces 14A, 14B along the length of the LOE. The LOE is oriented substantially perpendicular to the optical axis of the chief ray 16A. "Substantially perpendicular" includes a rotational offset of up to about 20 degrees in either direction. Rays from projector 12 enter the LOE through surface 14A. No air-gap exists between the exit aperture 12A of the projector 12 and surface 14A of LOE 14.

The near-eye display further includes a reflector 18 angled obliquely relative to the pair of parallel surfaces 14A, 14B so as to couple-in light from the projector 12 into the LOE 14 through surface 14B. The reflector 18 can be provided at least in part at a surface of a prism 19 which is adjacent to LOE 14 and bonded to surface 14B so that no air-gap exists between LOE 14 and prism 19. In some embodiments, the point 32A along the length of surface 14B at which prism 19 ends defines a "cut-off" along LOE 14 beyond which rays reflecting off surface 14B undergo TIR within the LOE.

The near-eye display is arranged such that each of the plurality of rays exiting projector 12 follows a light path comprised of, in order: entering the LOE 14 through the surface 14A at a first predetermined point defining an entry point associated with the respective ray, reflecting off surface 14A at a second predetermined point defining a reflection point associated with the respective ray, and subsequently undergoing TIR between surfaces 14A, 14B within the LOE. At least some of the rays, prior to reflecting off surface 14A at respective reflection points, will exit the LOE through surface 14B, reflect off reflector 18 back towards the LOE, and re-enter LOE through surface 14B, as shown in FIGS. 3A-3B.

As will be explained below, in order to effect TIR of ray 16B (as well as rays close to and parallel to 16B) in an air-gap free architecture, the near-eye display is arranged so that the predetermined point 20 at which extreme ray 16B reflects off surface 14A is located along the length of the LOE beyond the predetermined point 24 at which extreme ray 16C enters the LOE through surface 14A.

The interposition of the LOE 14 between projector and prism results in a longer ray path from projector 12 to reflector 18 relative to the prior art configuration shown in FIG. 2. Due to the longer ray path, after reflecting off reflector 18, ray 16B hits the LOE surface 14A at reflection point 20 along the length of surface 14A which is beyond the entry point 24 of ray 16C. As point 20 is beyond the farthest point at which rays exit the aperture of the projector, ray 16B (as well as rays close to 16B) can be forced to undergo TIR upon reflection from point 20. For example, as shown in FIG. 3A, an air space 26 can be created opposite point 20 by trimming a portion of the projector's exit aperture 12A beyond point 24. Alternatively, as shown in FIG. 3B, a reflective layer 28 can be bonded to a portion of surface 14A which includes point 20 but does not include point 24. The reflective layer can be a metallic (e.g. silver) or dielectric coating. Other types of reflective layers are also possible.

Figure 4:
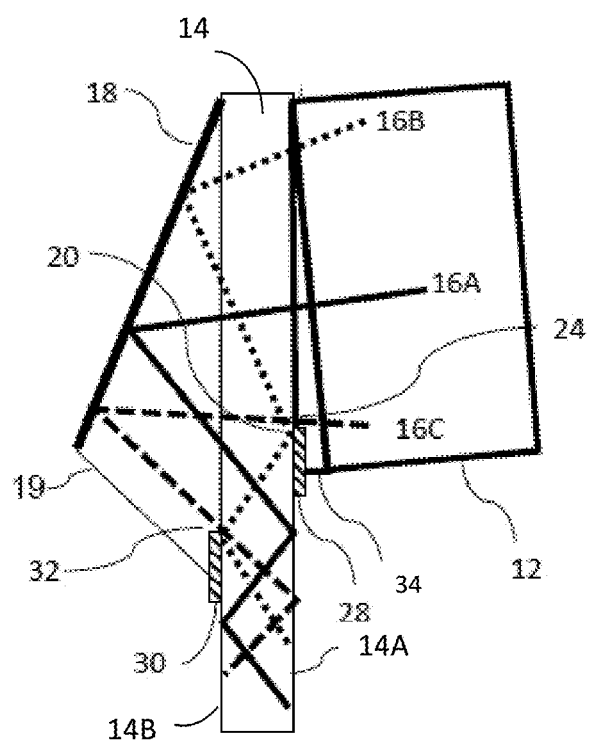
FIG. 4 illustrates schematically a cross-sectional view of a perpendicular near-eye display according to a third embodiment of the disclosed subject matter.

FIG. 4 illustrates schematically an alternative embodiment in which a wedge prism 34 is introduced between projector 12 and LOE 14. In this embodiment, the projector is at an angled orientation (e.g. as defined by chief ray 16A) relative to the LOE, and each of rays 16A-16C hit reflector 18 at respective points lower than the corresponding points in FIG. 3A-3B. In this case, the size of prism 19 can be reduced which may be desirable ergonomically. The wedge angle of prism 34, or more generally, the angular offset of the optical axis of the projected image relative to the major surfaces 14A, 14B of the LOE is small, typically between 1 degree and 15 degrees, thereby retaining a near-perpendicular overall geometry of image injection.

The embodiment shown in FIG. 4 further introduces yet another aspect (independent of wedge prism 34) in which prism 19 extends lower along LOE 14 and TIR is introduced at point 32 by means of a second reflective layer 30 as opposed to air.

Figure 5A:
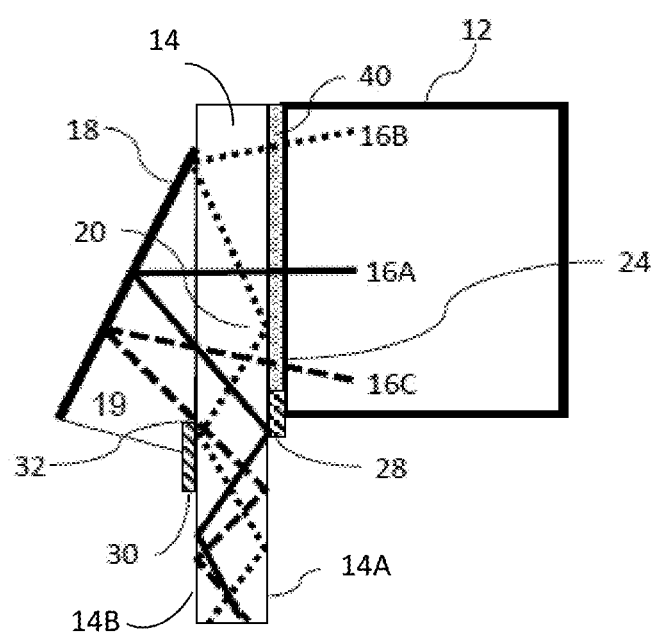
FIGS. 5A-5B illustrate schematically a cross-sectional view of a perpendicular near-eye display according to a fourth embodiment of the disclosed subject matter.
Figure 5B:
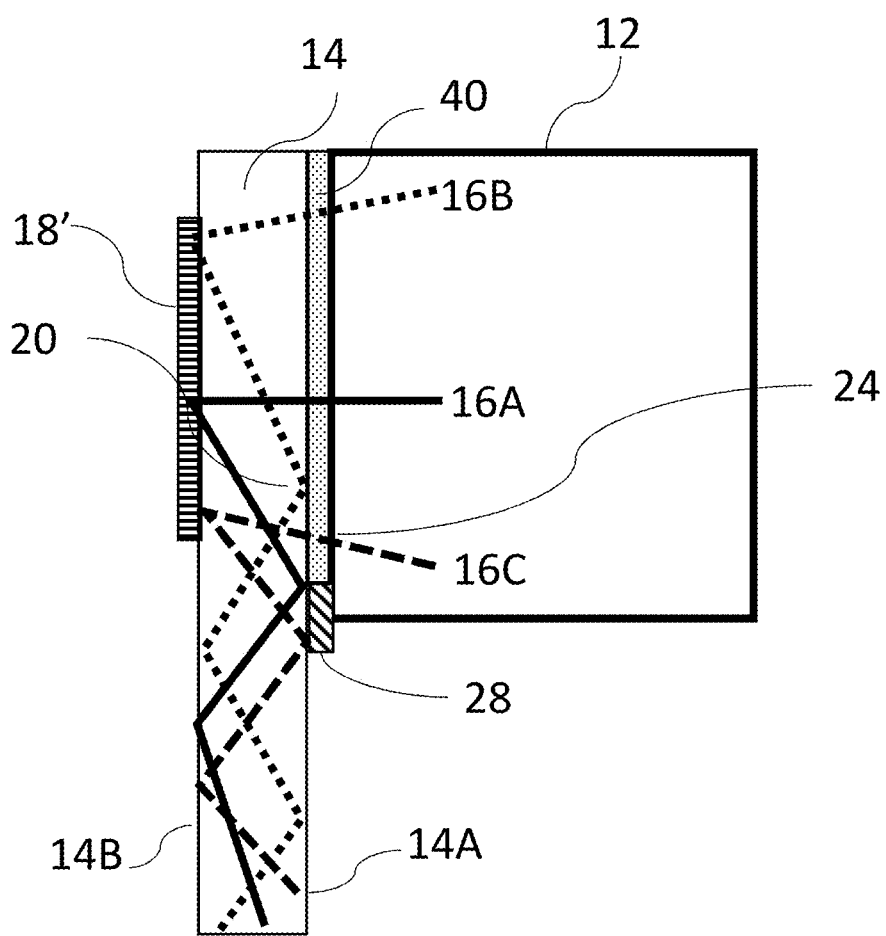

FIGS. 5A-5B illustrate schematically yet another embodiment in which an intermediate layer 40 consisting of an adhesive coating, or alternatively a transparent plate, is bonded between a first portion of the interlace between surface 14A and projector 12. The first portion includes the reflection point 20 of extreme ray 16B as well as the entry point 24 of extreme ray 16C. The intermediate layer 40 has a lower RI (e.g. RI=1.4) than that of LOE 14 (e.g. RI=1.6) so as to define a boundary that mimics an air-gap and generates TIR for at least a first portion of the image field of view, particularly ray 16B and those rays close to ray 16B, with angles shallowest relative to the major surfaces of the substrate, which reflect off surface 14A at the uppermost positions of surface 14A as illustrated.

The near-eye display further includes a coupling-in element 18' along a portion of surface 14B that is configured to re-direct light from the projector into the LOE through surface 14B. In this case, the coupling-in element 18' can be a prism with a reflective surface as shown in FIG. 5A, or alternatively a diffractive element (e.g. a diffractive grating) as shown in FIG. 5B.

In some embodiments, the LOE includes a reflective layer 28 is applied to a second portion of surface 14A (which in some embodiments may partially overlap the first portion) in order to generate TIR for a second portion of the image field of view that reflects off the lower portions of surface 14A at steeper angles which would not be trapped by the adhesive layer 40 (in the sense of being forced to undergo TIR upon reflection from surface 14A). Alternatively, the projector 12 can be trimmed at a point beyond entry point 24 of ray 16C in order to generate TIR for the second portion of the image field of view that reflects off the lower portions of surface 14A (i.e. those rays which hit the surface of the LOE at steeper angles which the intermediate layer would not have trapped for TIR within the LOE). In some embodiments, the first and second portions may partially overlap. That is, the intermediate layer 40 and reflective layer 28 may partially overlap.

Figure 5C:
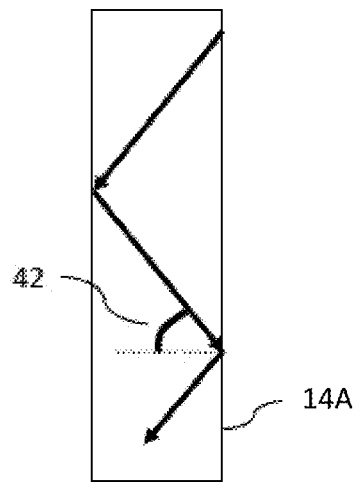
FIGS. 5C-5D illustrate schematically the range of incidence angles of rays required to undergo TIR upon reflection of surface 14A in the embodiment shown in FIGS. 5A-5B.
Figure 5D:
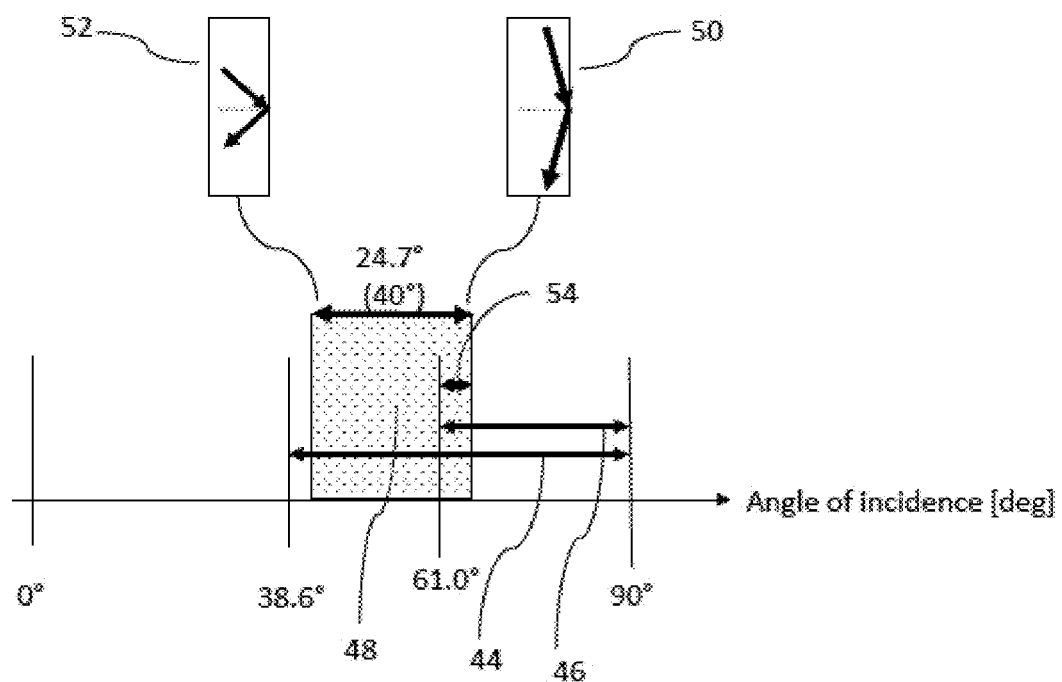

For greater clarification, reference is made to FIGS. 5C-5D illustrating the range of incidence angles for which the adhesive layer 40 is effective to force TIR. As shown in FIG. 5C, incidence angle 42 refers to the angle between the incident ray and the normal to the parallel surfaces of the LOE. Referring now to FIG. 5D, assuming an LOE having RI=1.6 that is surrounded by air, the critical incidence angle for TIR is approximately 38.6 degrees. Therefore, rays in range 44 having incidence angles between 38.6 degrees and 90 degrees will undergo TIR. Surrounded by an adhesive layer with RI=1.4, however, the critical angle becomes 61 degrees, thus rays with incidence angles between 61 degrees and 90 degrees will undergo TIR. Practically though, with the adhesive layer, the full range of ray angles hitting surface 14A are shown via the shaded area 48 along the x-axis (approximately 41.3 degrees to approximately 66 degrees). Parenthetically, an angular field of view width of approximately 24.7 degrees (i.e. 41.3 degrees-66 degrees) within the LOE corresponds approximately to an injected image field of view of approximately 40 degrees in air using Snell's law approximation. The high angular section of the image has shallower incidence angles 50 and relates to rays parallel to 16B in FIG. 5A, while the low angular section relates to steep incidence angle 52 and associated with rays parallel to ray 16C.

Within the range 48 of incidence angles of rays required to undergo TIR, the adhesive layer 40 with RI=1.4 is effective to force TIR for rays in range 54, i.e. having incidence angle at surface 14A between 61-66 degrees. Thus, reflective layer 28 (or alternatively trimming of the projector) is required for rays hitting 14A at angles less than 61 degrees, i.e. in the range of approximately 41.3-61 degrees.

Thus, in this embodiment, rays in a first part of the image angular field of view having incidence angles (as defined above) above the critical angle (e.g. 61 degrees in the above example) are forced to undergo TIR upon reflection from surface 14A via the intermediate layer 40 which has a lower RI than that of the LOE. Conversely, rays in a second part of the image angular field of view having incidence angles (as defined above) below the critical angle are forced to undergo TIR upon reflection from surface 14A either by the reflective layer 28, or by hitting points along surface 14A further down the LOE where surface 14A shares an interface with air.

The embodiment shown in FIGS. 5A-5B has the additional advantage over the embodiments shown in FIGS. 3A-3B that the point at which ray 16B reflects off of LOE surface 14A can even be before the point at which ray 16C is transmitted through LOE surface 14A since the adhesive layer 40 will selectively reflect or transmit rays based on angle of incidence. Furthermore, the size of the projector exit aperture 12A can be reduced without compromising TIR of ray 16B.

The accurate angular range of TIR with the glue and consequent spatial placement of reflective layer 28 can be defined by using numerical non-sequential simulation tools such as Zemax™ software or LightTools™.

Although all of the examples detailed herein are based on coupling in and out of images to the substrate by reflective or partially-reflective surfaces, it should be noted that the same principles may equally be implemented in the context of diffractive elements used for coupling in and out of the images, with corresponding modifications as is known in the art. For example, the slanted coupling-in reflector would be replaced by a diffractive surface typically on, or parallel to, the major surface of the substrate. All such modifications are within the capabilities of a person ordinarily skilled in the art on the basis of the disclosure herein.

The invention claimed is:
1. A near-eye display comprising:
a projector comprising an optical exit aperture through which are transmitted a plurality of rays including a first extreme ray and a second extreme ray defining, respectively, opposite sides of an image angular field of view and opposite sides of the optical exit aperture so that said first and second extreme rays converge from opposite sides of the optical exit aperture, and a chief ray defining a midpoint of the image angular field view;

a light-guide optical element (LOE) comprising first and second parallel surfaces along a length thereof and oriented substantially perpendicular to the chief ray, the LOE having a first refractive index (RI) that defines a first critical angle for internal reflection at an interface of the LOE with air; and a reflector angled obliquely relative to the pair of parallel surfaces so as to couple-in light from the projector into the LOE, the reflector provided at least in part at a surface of a prism adjacent to the LOE;

wherein the projector is attached to the first parallel surface of the LOE via an intermediate layer having a second RI lower than the first RI, thereby defining a second critical angle for internal reflection for rays within the LOE incident on a boundary with the intermediate layer, the second critical angle being greater than the first critical angle, and wherein the near eye display is arranged such that each of the plurality of rays follows a light path including, in order: exiting the optical exit aperture of the projector and entering the LOE through the first parallel surface at a predetermined entry point associated with the respective ray, reflecting from the obliquely angled reflector, reflecting off the LOE's first parallel surface at a predetermined reflection point associated with the respective ray, and subsequently propagating along the LOE by total internal reflection within the LOE, and wherein the first extreme ray, after reflection from the obliquely angled reflector, is incident on the boundary with the intermediate layer at an angle of incidence greater than the second critical angle, and wherein the second extreme ray, after reflection from the obliquely angled reflector, is incident on the first parallel surface at an angle greater than the first critical angle and smaller than the second critical angle but outside an area of the boundary with the intermediate layer.

2. The near-eye display of claim 1, wherein the intermediate layer comprises an adhesive layer or a transparent plate.

3. The near-eye display of claim 1, wherein a portion of the first parallel surface outside the area of the boundary with the intermediate layer is coated with a reflective layer.

4. The near-eye display of claim 3, wherein the reflective layer comprises one of a metallic coating or a dielectric coating.

* * * * *